Jan. 16, 1951   L. BLUMENBAUM   2,538,665
GEAR BOX

Filed July 8, 1948   4 Sheets-Sheet 1

INVENTOR.
Louis Blumenbaum
BY
Barlow & Barlow
ATTORNEYS.

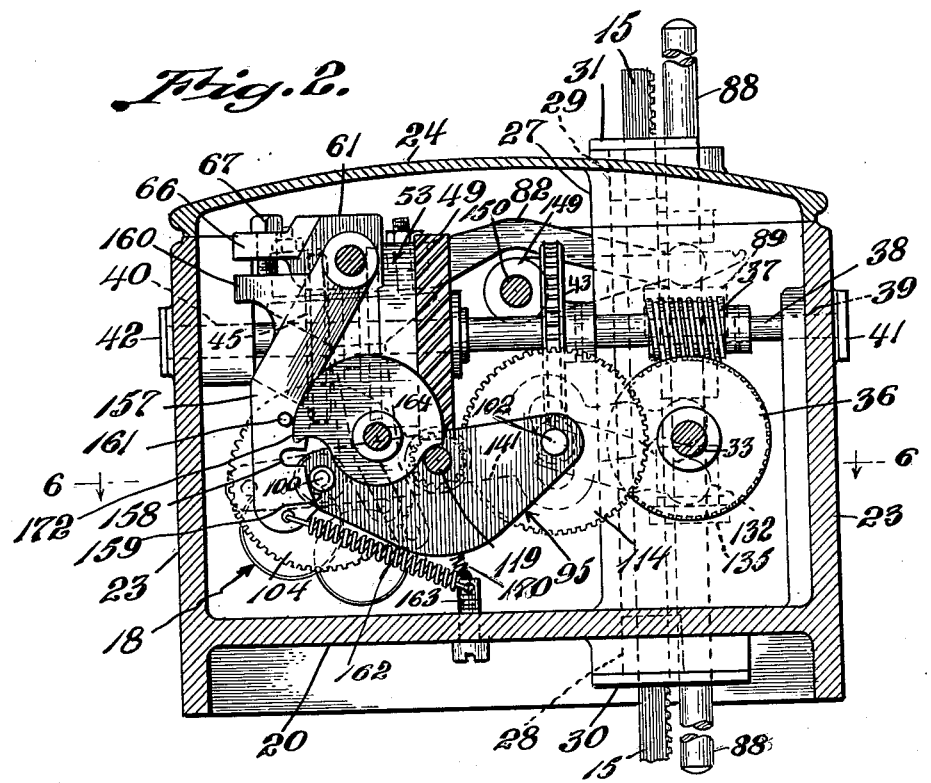
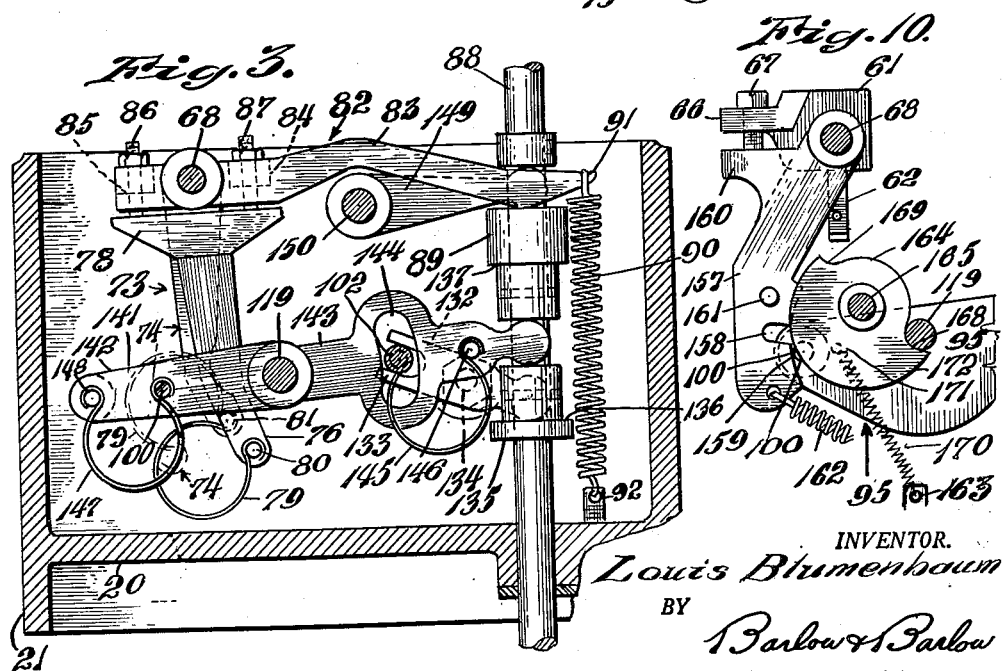

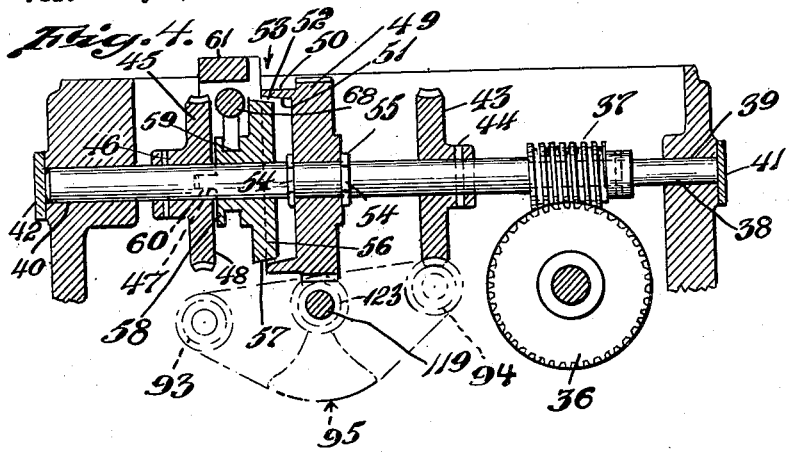
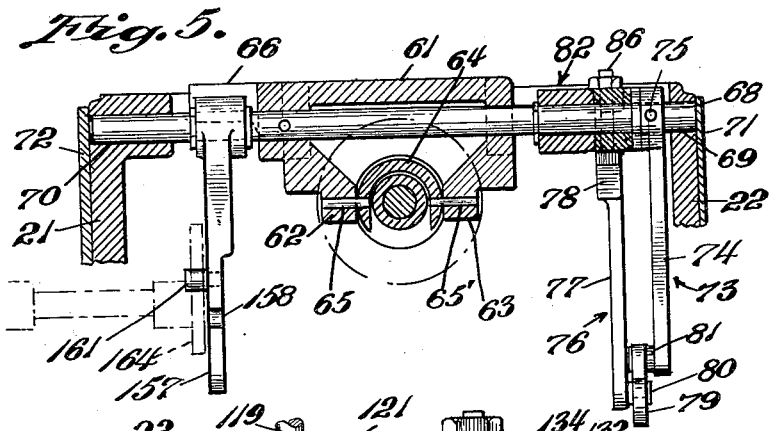
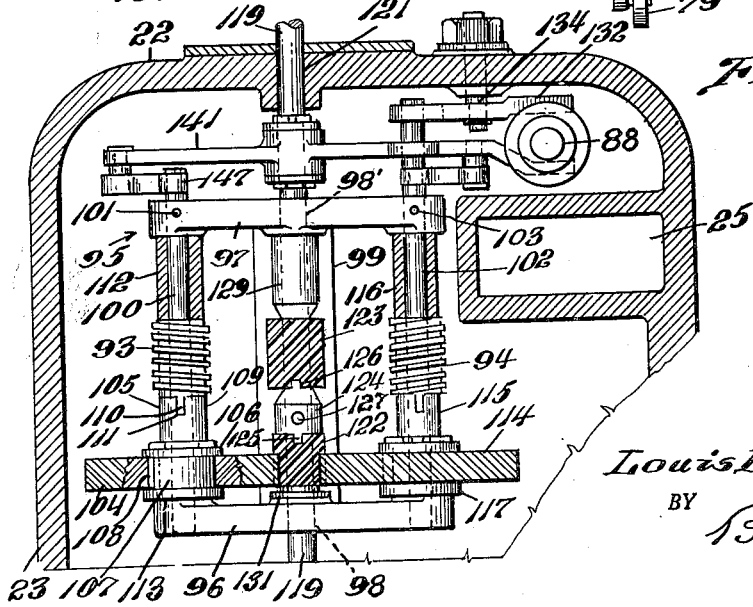

Jan. 16, 1951  L. BLUMENBAUM  2,538,665
GEAR BOX
Filed July 8, 1948  4 Sheets-Sheet 4
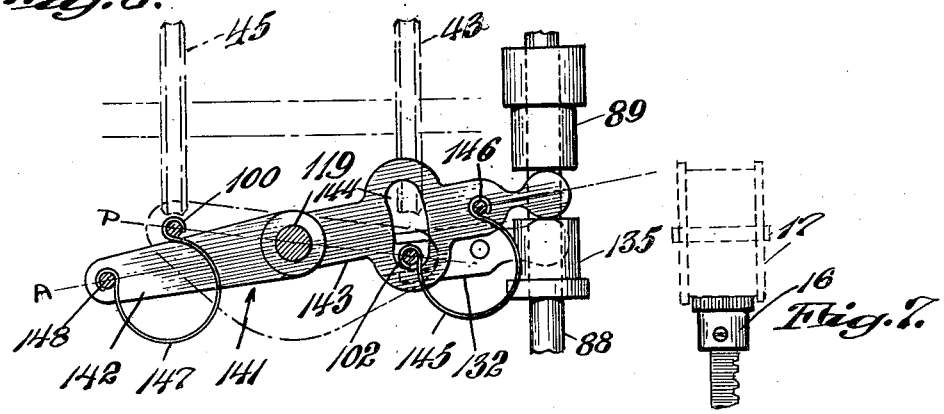
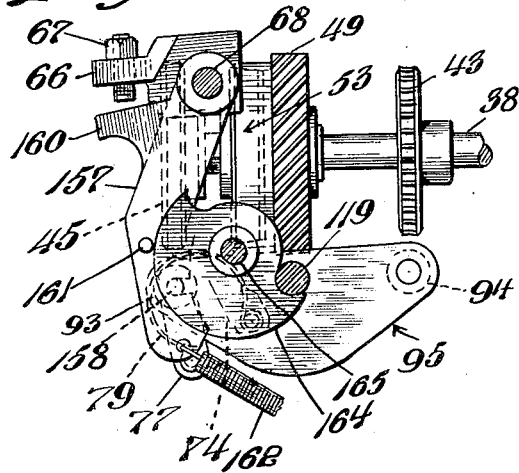
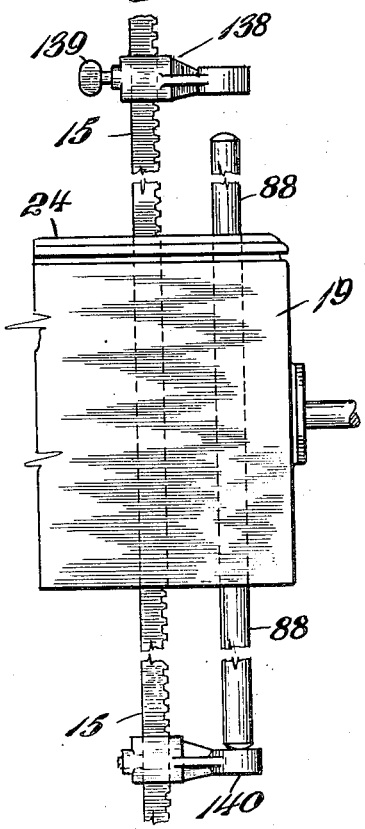
INVENTOR.
*Louis Blumenbaum*
BY *Barlow & Barlow*
ATTORNEYS.

Patented Jan. 16, 1951

2,538,665

UNITED STATES PATENT OFFICE 2,538,665

GEARBOX

Louis Blumenbaum, Cranston, R. I., assignor to Scott Testers, Inc., a corporation of Rhode Island Application July 8, 1948, Serial No. 37,677

12 Claims. (Cl. 74—29)

This invention relates to an improvement in a testing machine, particularly to the gearing mechanism which controls the force applied to a specimen under test.

The usual gearing mechanism referred to as the gear box of a testing machine is limited by its design to one particular type of testing. If the specimen is to be subjected to a tensile test, a gear unit is employed which operates to provide a particular motion adapted to conduct the test. When the specimen is subjected to a test for hysteresis, a different unit is employed operable to provide a different motion. It is desirable to provide in a testing machine a single unit or gearing mechanism operable to provide a motion adapted to conduct a tensile test and a motion to conduct a hysteresis test.

An object of the invention is the provision of a gearing mechanism for a testing machine so constructed as to combine the motion cycles heretofore transmitted from two separate gearing units.

Another object of the invention is the provision of a gearing mechanism for a testing machine so constructed as to combine the motion cycles heretofore transmitted from two separate gearing units and to be controllable by the operator to select either of these motions or to change from one to the other at will during the progress of a test.

Another object of the invention is the provision in a testing machine equipped with a reciprocating rack for applying a work stroke to the specimen of a gearing mechanism for reciprocating the rack wherein the change of direction of movement of the rack will be repetitive at definite points.

Another object of the invention is the provision in a testing machine equipped with a reciprocating rack for applying a work stroke to the specimen of a gearing mechanism for reciprocating the rack at a uniform speed in either direction.

Another object of the invention is the provision in a testing machine equipped with a reciprocating rack for applying a work stroke to a specimen of a gearing mechanism for moving the rack at a uniform speed on the work stroke thereof and at an accelerated speed on the return stroke.

Another object of the invention is the provision of a gearing mechanism for a testing machine so arranged as to be either manually or automatically controlled for changing the direction of motion thereof.

Another object of the invention is the provision in a testing machine equipped with a reciprocating rack for applying a work stroke to the specimen of a gearing mechanism for reciprocating the rack wherein the change of direction of movement of the rack may be manually controlled in either direction during the travel thereof.

With these and other objects in view, the invention consists of certain novel features of construction, as will be more fully described and particularly pointed out in the appended claims.

In the accompanying drawings:

Figure 2 is a vertical section taken substantially along line 2—2 of Figure 1;

Figure 3 is a similar view taken substantially along line 3—3 of Figure 1;

Figure 4 is a sectional view of a fragmental portion of the gear box taken substantially along line 4—4 of Figure 1;

Figure 5 is a sectional view of a fragmental portion of the gear box and showing the yoke arrangement for operating a clutching device forming part of the invention;

Figure 6 is a sectional view taken substantially along line 6—6 of Figure 2 but omitting a plurality of elements so as to more clearly illustrate the drive shaft and elements physically related thereto;

Figure 7 is an edge view of the gear box with a portion of the testing machine associated therewith;

Figure 8 is an elevational view illustrating the relative position of certain elements of the gear box;

Figure 9 is a view of the clutching device and means for controlling the same; and Figure 10 is an elevational view of certain elements shown in Figure 9.

Figure 1:
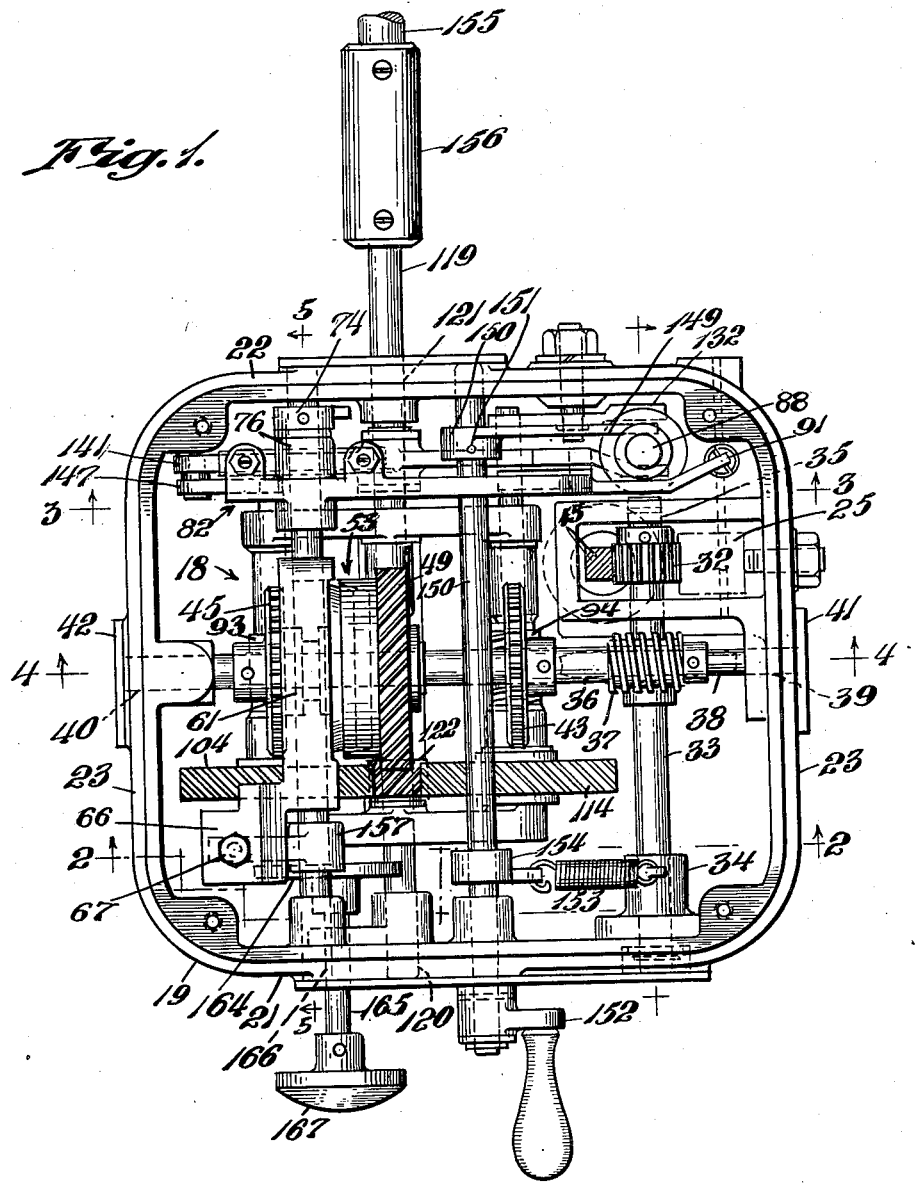
Figure 1 is a top plan view with the cover removed of a gear box for a testing machine embodying my invention.

The invention comprises providing a movable support for the tiltable beam of an inclined plane type testing machine. The support is in the form of a platform mounted at one end of a rack. The rack is reciprocated by means of a gear pinion. Motion is transmitted from a suitable power source, such as an electric motor, by means of a plurality of gears which are automatically placed into or out of motion transmitting relation. Manually operable means are also provided which the operator may actuate at will to automatically place certain of the gears in neutral relation upon a change in direction of motion of the rack during the progress of a test. Manual means are also provided operable for changing the direction of movement of the said rack while in motion whereby the rack may be reversed in its movement during the progress of a test.

With reference to the drawings, 15 (see Figure 7) designates a rack which is reciprocally mounted and shown in the present instance as adapted to be used with a testing machine of the inclined plane type wherein the force is applied to a specimen by means of a weighted carriage movable on a pivoted beam. The rack has attached thereto a support 16 on which rests the beam 17 of the machine. The beam moves downwardly by gravity and is controlled in its movement by the rack. The rack 15 is reciprocated by a gearing mechanism designated generally 18 (see Figure 1) which is contained within a casing 19 having a bottom, front, rear, and side walls 20, 21, 22, and 23 respectively. A closure 24 is removably secured to the casing, such as by being bolted in place by screws (not shown). The casing is sealed so as to hold lubricant to a depth therein sufficient to lubricate the moving elements of the gearing mechanism.

The casing is also provided with a well 25 (see Figures 1 and 6), the walls of which extend from the bottom 20 upwardly to the plane of the upper edges of the casing. The upper portion of the well 25 is closed by means of walls 27 (see Figure 2), depending from the top wall of the closure in line with and engaging the upper edge of the walls of the well. An opening 28 extends through the bottom of the well and aligns with a similar opening 29 in the closure 24. Guide bushings 30 and 31 similar to each other are received in these openings and are there secured in place, in any manner (not shown). The rack extends through these guide bushings and is guided thereby in the movement thereof.

The rack 15 is engaged by a pinion gear 32 (see Figure 1) positioned within the well and mounted on a shaft 33 which is journaled at one end in a bearing 34 formed in the front wall 21 of the casing and at the other end in a bearing opening 35 in the wall of the well. The rotation of the shaft 33 in a counterclockwise direction as viewed from the front of the machine, will move the rack downwardly to impart a working stroke thereto, to control the movement of the beam 17. The movement of the shaft in the other direction will impart a return movement to the rack to move the beam 17 to initial position.

Motion is transmitted to the shaft 33 by means of a worm gear 36 secured to the shaft so as to rotate therewith (see Figures 1 and 2). This worm gear is engaged by a worm 37 that is fixed to a shaft 38 so as to rotate therewith. Shaft 38 extends at right angles to the shaft 33, and the ends thereof are journaled in the bearing openings 39 and 40 provided in the side walls 23 of the casing. These openings are sealed by means of plates 41 and 42, which plates also serve as thrust plates to prevent axial movement of shaft 38. The clutch shaft 38 has mounted thereon a right-hand worm gear 43 attached thereto such as by a pin fastening 44 (see Figure 4) and a left-hand worm gear 45 attached to the shaft 38 such as by a pin fastening 46. The worm gear 45 is provided with a recess 47 extending in the side 48 thereof. The clutch shaft also has a helical gear wheel 49 mounted thereon for free rotation on the shaft and has a hollow portion 50, the inner walls 51 of which taper inwardly providing a socket member 52 of a cone clutching device designated generally 53. The helical gear 49 is prevented from endwise movement by means of grooves 54 provided in the shaft on either side of the gear 49 and engaged by split rings 55. The other or male member 56 of the clutching device is slidably mounted on the shaft 38 and is provided with a tapered periphery 57 providing the frustro-conical surface which is frictionally engageable with the surface 51. The clutch cone 56 is also provided with a hub portion 58 having an annular groove 59 and a projection 60 which is received in the recess 47 in the worm gear 45, whereby the clutch cone 56 and worm gear 45 will be joined to each other for rotational movement as a unit.

The clutching device 53 is controlled by means of a yoke element 61 (see Figure 5) having opposite depending arms 62 and 63 between which is movably mounted a clutch thrust ring 64 such as by means of pins 65 extending through the arms 62 and 63 into the ring 64. The yoke 61 also has a projection 66 (see Figure 9) through which there extends a threaded member 67 for a purpose to be hereinafter described. The yoke is mounted on a shaft 68 which finds bearings in openings 69 and 70 (see Figure 5) provided in the front and rear walls 21 and 22 of the casing. These openings are sealed by plates 71 and 72, which plates also serve to position shaft 68 and clutch thrust ring 64.

The clutch shaft 68 is rocked by means of a lever arrangement designated generally 73 (see Figures 3, 5, and 6). The arrangement comprises a lever 74 which is secured at one end thereof to the shaft 68 such as by a pin fastening 75 and depends therefrom generally vertically. A second lever 76 is pivotally mounted at one end thereof on the shaft 68 for relative movement therewith, and also has an arm 77 depending therefrom and is provided with a shelf 78 extending laterally of the arm 77 on either side of the shaft 68 (see Figure 3). An arcuate or so-called horseshoe spring 79 has one horn thereof attached to the lever 76 as by means of a pin 80, and the other horn is attached to the lever 74 as by means of a similar pin 81. The spring tends to maintain these two levers apart; that is, the thrust exerted by the spring is such that the lower ends of these levers will be moved away from each other. A third lever 82 (see Figure 3) is also pivotally mounted on the shaft 68 and has an arm 83 extending generally horizontal and ears 84 and 85 extending on either side of the shaft 68 and directly above the shelf 78. Each ear has a threaded abutment 86 and 87 adjustably secured therein which extends therefrom into engagement with the shelf 78, whereby upon movement of the lever 82 motion therefrom will be transmitted to the lever 76 to move the same about the shaft 68. The lever 82 is moved counter-clockwise by means of a control rod 88 having a collar 89 fixed thereto and against which the arm 83 of the lever engages. A pull spring 90 has one end attached to the lever as at 91, and the other to an anchor pin 92. Upon a downward movement of the control rod 88, the lever 82 will be yieldingly moved by the spring 90 to follow the control rod. Through the connections 86 and 87, the motion will be transmitted from lever 82 to move the lever 76 to swing past the lever 74, whereupon the spring 79 contracted by the movement of lever 76, will expand and swing the lever 74 in a counter-clockwise direction, as viewed in Figure 3, and rock the yoke to clutch the members 52 and 56 into frictional engagement whereby the clutch shaft 38 will now be in driving relation with the gear 49. Upon movement of the control rod 88 in the opposite direction the lever 76 will be moved past the lever 74 from the opposite direction and the spring 79 will move the lever 74 to rock the yoke shaft 68 to disengage the clutch device 53.

Motion is transmitted to the clutch shaft by means of worms 93 and 94, which are selectively moved into engagement with the worm gear 43 or 45 (see Figures 4 and 6). These two worms 93 and 94 are left and right hand respectively and are mounted on a rocker designated generally 95, which is rockably mounted so as to move either one or the other of the worms into engagement with the worm gears. The rocker 95 consists of plates 96 and 97 having central aligned openings 98 and 98' and joined by a cross member 99. A rod 100 extends between the plates 96 and 97 at one edge thereof and is secured in place such as by a pin fastening 101. This rod 100 is of a length to extend beyond the plate 97. A similar rod 102 extends between the plates at the opposite edge thereof and is secured in place such as by a pin fastening 103. The rod 102 is also of a length to extend beyond the plate 97. The worm 93 is mounted for rotation on the rod 100, which rod also carries a gear 104 which is joined to the worm 93 so as to rotate therewith by means of a coupling 105. The coupling 105 comprises a bushing mounted for free rotation on the rod 100 and is provided with a collar 106 intermediate the ends thereof and has a portion 107 which is received in the gear 104 and there secured such as by means of a spline connection 108. The coupling is also provided with a reduced portion 109 which has a recess 110 in the end thereof and receives therein a projection 111 extending from the adjacent side of the worm 93. Endwise movement of the worm 93 and the gear 104 on the rod 100 is prevented by means of a collar 112 positioned between the plate 97 and the worm 93 and a collar 113 positioned between the gear 104 and the plate 96. The worm 94 is similarly mounted on the rod 102 and attached to a gear 114 by means of a like coupling 115. Endwise movement is also prevented by means of collars 116 and 117. The rocker 95 is mounted for rocking movement on a shaft 119, so as to place either of the worm 93 or 94 into engagement with the worm gears 45 and 43 respectively. The shaft which is the main drive shaft of the gear unit extends through openings 98 and 98' in the rocker and is journaled in bearing openings 120 and 121 formed in the front and rear walls of the casing.

The gears 104 and 114 are rotated by means of a gear pinion 122, which is mounted on the shaft 119 so as to rotate therewith. The gear pinion 122 is positioned between the gears 104 and 114, whereby upon rotation of the shaft 119 the gears 104 and 114 will be rotated in the same direction. There is also mounted on the shaft 119 a gear pinion 123 which meshes with the gear 49 on the clutch shaft. These two gear pinions are connected to rotate with each other by means of a coupling 124 positioned between the gear pinions, there being end splines 125 and 126 which engage in complementary recesses in the adjacent sides of the gear pinions 122 and 123. The coupling may be secured to the shaft such as by means of a pin fastening 127. Endwise movement of the gear pinions and rocker on the shaft is prevented by a collar 129 positioned between the gear pinion 123 and the plate 97 and a collar 131 positioned between the gear pinion 122 and the plate 96.

The rocker is moved about the shaft 119 by means of a lever 132 (see Figures 3 and 8), having a bifurcated arm 133 which extends into engagement with the end portion of the rod 102. The lever is pivotally mounted on a pivot pin 134 fastened to the wall 22 of the casing. Moving the lever about the pivot 134 will move the rocker about the shaft in either one or the other direction. The lever 132 which will be now referred to as the kick-off lever is moved by means of the control rod 88. The control rod extends through the casing beyond the top and bottom thereof, and on this rod 88 there is provided a collar 135 having a shoulder 136 facing the shoulder 137 provided on the collar 89, previously described (see Figure 3). The end of the lever 132 extends between and is in the path of movement of the shoulders 136 and 137 to be engaged thereby upon movement of the rod 88 a sufficient distance in either direction. The control rod is reciprocated by means of an abutment or trip dog 138 (see Figure 7), which is adjustably secured to the rack 15 above the casing in position to engage the upper end of the control rod 88. A thumb screw 139 is provided for readily adjusting the trip dog 138 along the length of the rack 15. A similar trip dog 140 is also adjustably secured to the portion of the rack below the casing and is in position to engage the lower end of the control rod 88. Upon a predetermined downward distance of travel of the rack 15, the trip dog 138 will engage the upper portion of the rod 88 and move the same therewith. Upon the reversal of the travel of the rack 15, the trip dog 140 will engage the lower end of the control rod 88 and move the same in the opposite direction.

In order to provide a quick or snap action for swinging the rocker from one side or the other, a trip lever 141 is provided (see Figures 3, 6, and 8). The trip lever 141 is a straight lever providing opposite arms 142 and 143 and is pivotally mounted on the drive shaft 119. The extreme portion of the arm 143 extends between the collars 89 and 135 in engagement therewith to be moved thereby upon movement of the control rod. The arm 143 is also provided with an arcuate slot 144 through which the rod 102 of the rocker passes. The longitudinal axis A (see Figure 8) of the trip lever 141 is normally on one side or the other of a plane P passing centrally through the rod 101 and 102 and the shaft 119. A horseshoe spring 145 has one horn thereof attached to the arm 143 by means of a pin 146 and the other to the rod 102. A similar spring 147 has one horn thereof attached to the end portion of the arm 141 such as by means of a pin 148 and the other to the rod 100. When the relative position between the rocker and the lever 141 is as shown in Figure 8, the springs 145 and 147 will be at the maximum expansion, which is sufficient to oppose a free movement of the rocker 95 about its pivot. When the lever 141 is moved by the movement of the control rod 88 in either direction a distance sufficient to move the axis A into register with the plane P, the horns of the springs will have been moved towards each other to contract or place the springs in maximum compression. See Figure 3 wherein the connecting points 148, 100, 102 and 146 are all in line at the instant the control rod 88 has been moved in either direction to compress the springs 145 and 147 to their maximum compression. Upon further movement of the control rod 88, the kick-off lever 132 will have been engaged and moved sufficient to swing the axis A of the rocker 95 past the plane P whereupon the springs will expand and force the connecting points 148 and 100 apart, and similarly 102 and 146 to continue the movement of the rocker by a snap action.

It is often desirable to reverse the movement of the rack 15 manually, and to this end a manually controlled lever 149 is secured to a shaft 150 such as by means of a pin fastening 151 (see Figures 1, 2, and 3). The extreme end portion of the lever 149 extends to engage the upper side of the collar 89. The shaft 150 is journaled in the side wall 23 and the front walls 21, and extends therebeyond and is provided with a handle 152. A pull spring 153 is attached to the shaft such as by a link connection 154 to bias the lever 149 into engagement with the collar 89. It will be apparent that the rotation of the shaft 150 in a clockwise direction, as viewed in Figure 1, will move the lever 149 attached thereto so as to move the control rod 88 downwardly and thereby cause the rocker to be swung about the shaft 119 so as to reverse the direction of movement of the rack 15 and cause it to ascend conversely; if the rack 15 is ascending, motion of shaft 150 counterclockwise will move control rod 88 upwardly, causing the rocker to reverse and cause the rack to descend.

Power may be applied to the gearing mechanism through any suitable source, preferably by means of an electric motor (not shown) and is transmitted therefrom through the motor shaft 155 connected to the main drive shaft 119 by means of a coupling 135 (see Figure 1). With the motor in motion, power is transmitted through the gear pinion 122 to the gear wheels 104 and 114, and the worms 93 and 94 coupled therewith. Motion is also transmitted to the gear 49 through the gear pinion 123. Swinging the rocker about the shaft in a direction to place either of the worms 93 and 94 into engagement with the worm gears 43 and 45 will transmit motion to the clutch shaft and rotate the same in either one or the other direction at equal speeds. Clutching the gear 49 to place the same into driving engagement with the clutch shaft 38 will rotate this clutch shaft through the gear 49 at a greater speed than either of the gears 43, 45.

In order to block the clutching device from operating at such times as when either of gears 43 or 45 is engaged by worms 93 or 94 I mount a lever 157 for free rotation upon the shaft 68 (see Figures 2, 5, 9, and 10). This lever depends generally vertically from the shaft and is provided with a recess 158 opening into the side 159 thereof and is provided with a shelf 160 which is positioned to be engaged by the member 67 heretofore mentioned and carried by the projection 66. The lever also has a pin 161 projecting therefrom. A pull spring 162 is attached at one end to the lever 157 and at the other end to a pin 163 whereby the lever is spring urged in one direction. A cam 164 is mounted on a shaft 165 to be rotated thereby. The shaft 165 is journaled in a bearing opening 166 in the front wall 21 of the casing and extends therefrom, and is provided with a knob 167 for manually rotating the cam 164. The cam is provided with abutments 168 and 169 in the form of a curved surface to engage the shaft 119 so as to limit the movement of the cam in either one or the other direction. A pull spring 170 is attached at one end to the cam as at 171 and the other end is suitably anchored to the stud 163 to bias either of the abutments 168, 169 into engagement with the shaft 119. When it is desired to keep the gear 49 out of driving relation with the shaft 38, the high point of the cam 172 is positioned so as to be engaged by the pin 161 (see Figure 2) so as to maintain the lever at the position shown in Figure 2. With the lever in this position the shelf 160 will be so positioned as to engage the member 67 and prevent the rotation of yoke member 61 and the engagement of member 56 with the socket 50.

When it is desired that the gear 49 be placed into driving relation with the shaft 38, the cam 164 is rotated counterclockwise to remove the high point 172 thereof from engagement with the pin 161 (see Figure 10). The lever 157 will then be permitted to move by means of the pull spring 162, but will be arrested in this movement by the surface 159 engaging the rod 100. Upon a subsequent rocking or swinging of the rocker, the rod 100 will at one point in its movement be in a position to enter the slot 158. The lever 157, under the urge of the spring 162, will move to receive the rod 100 in the slot and arrest further movement of the rocker and thus place the worms 93 and 94 in a neutral position. The shelf 160 on the lever 157 will then be in spaced relation with the member 67 whereby freeing shaft 68 to be controlled by the interaction of levers 82, 74, and 76 to clutch the gear 49 into driving relation with the clutch shaft 38.

The relative position of the components of the gear mechanism, at the start of the operating cycle, is such that the rack 15 is placed in the upper position. The motor is assumed to be in motion. The rocker 95 is locked in the neutral position by means of the rod 100 engaging in the recess 158 in the neutral lever 157. The collars 89 and 135 are properly adjusted along the control rod 88 whereby to position the trip lever 141 past the rocker 95 with the springs 145 and 147 in compression to swing the rocker to place the worm 94 into engagement with the worm gear 43 upon release of the rocker 95 from the neutral position. To set the gearing mechanism in motion after the motor has been actuated, the cam 164 is rotated clockwise and the high side 172 thereof will engage the pin 161 to disengage and maintain the neutral lever 157 out of engagement with the rocker 95 (see Figure 2), whereupon the rocker 95 under the influence of the springs 145 and 147 will be swung about the shaft 119 to place the worm 93 in engagement with the worm gear 45. Motion will now be transmitted through the worm gear 45 to rotate the clutch shaft 38 in a direction to move the rack 15 downwardly. Upon a predetermined distance of downward travel of the rack 15, the trip dog 138 attached thereto will engage the control rod 88 and move the same therewith to actuate the trip and kick-off levers 141 and 142 respectively, whereby through the action of the springs 145 and 147 the rocker 95 will be swung in the opposite direction to disengage worm gear and worm 45, 93 and place worm gear and worm 43, 94 into engagement. Motion will now be transmitted through the worm gear 43 to rotate the clutch shaft at the same speed but in the opposite direction and move the rack 15 upwardly. Upon a predetermined upward distance of travel of the rack 15, the trip dog 140 thereon will engage the other end of the control rod 88 and move the same to actuate the trip and kick-off levers 141 and 142 from the opposite direction and swing the rocker 95 to disengage the worm gear and worm 45, 93 and re-engage worm gear and worm 43, 94. This motion will continue uninterrupted while the cam 164 engages the pin 161 of the neutral lever 157.

In order to position the rocker 95 in a neutral position, the cam 164 is rotated counter-clockwise to place the low side thereof opposite the pin 161. The neutral lever will now be permitted to move by the spring 162 and the side 159 thereof will come to rest on the rod 100. Upon a subsequent movement of the rocker, the rod 100 will ride into the recess 158 and be locked in neutral position, which will place both the worms 93 and 94 out of engagement with the worm gears 43 and 45. Should the cam 164 be rotated to place the rocker 95 in a neutral position, while the rack 15 is moving downwardly, the rocker 95 will be swung as previously described to disengage the worm gear and worm 43, 94 when the rack 15 has been moved the predetermined downward distance. The movement of the neutral lever 157 under the influence of the spring 162 to engage the rod 100, will space the shelf 160 from the member 67. With the shelf 160 in this position (see Figure 9) the clutching device 53 will be moved by the action of the levers 73, 76, and 82 to connect the clutch shaft 38 with the gear 49, in the manner previously described. Motion will now be transmitted to the shaft 38 through the gear 49 in a direction to move the rack upwardly to initial position at an accelerated speed and there come to rest. Should the cam 164 be rotated to place the rocker in a neutral position while the rack is moving upwardly by means of worm and worm gears 94 and 43, the rocker 95 will be swung at the upper limit of the rack, in a direction to disengage the worm gear and worm 43 and 94, and since the clutch device 53 is out of engagement, there will be no gearing engagement to drive shaft 38 and the rack 15 will come to rest in the upward initial position.

In Figure 2 the various elements of the gear unit are shown operable for providing a motion for conducting a hysteresis test. The rack 15 is shown moving upward at the instant before reversing. Upon further movement of the rack in the same direction, the trip dog 140 will engage and move the control rod 88 in the same direction to actuate and move the rocker to disengage the worm gear and worm 43, 94 respectively and engage the worm gear and worm 45, 93 to reverse the direction of travel of the rack. This motion above stated will continue until the rack is brought to rest in a manner as previously described.

In operating the gear box for a tensile test, cam 164 is rotated to its limit clockwise, actuating rocker 95 and starting the operating cycle in the same manner as for the hysteresis test heretofore described. After rack 15 has started downward, with worm 45 engaging worm gear 93, cam 164 is rotated counter-clockwise to its limit, allowing neutral lever 157 to contact shaft end 100. Mechanisms are now positioned as shown in Figure 10, as previously described, whereby, when rack 15 reaches the bottom of its stroke and is reversed, rocker 95 rotates to neutral, engaging shaft end 100 in slot 158, both sets of worms and worm gears 93 and 45, and 94 and 43 are disengaged, clutching mechanism 53 is engaged, drawing rack upward at high speed, where it stops at the top of its stroke.

In some forms of hysteresis testing it is desirable to apply a reversing stress to the sample while it is under a partial load. This may be accomplished, provided first that rack 15 is allowed to travel downward from starting position approximately one-fifth of its total travel, by rotating operating handle 152 clockwise and counter-clockwise, thus reversing and re-reversing the direction of the rack and hence the machine load. Handle 152 may be swung from side to side in this manner as many times as desired and, within reasonable limits as rapidly as desired, giving to rack 15 a very short up and down motion. This special operation may be performed from either upward or downward motion of the rack.

It is also sometimes desirable, either because of the test sample breaking prematurely or for some other reason, to return the testing instrument to its starting position without waiting for the full cycle to be completed. For this purpose the operator may at will, rotate the control knob 167 counter-clockwise thus setting neutral lever into the aspect shown in Figure 10, then move operating handle 152 clockwise if the rack is travelling downward or counter-clockwise if the rack is rising. Such motion of the control handle 152 will disengage the rocker and enclutch the high speed gearing, in a manner previously described, causing the rack to travel upward at high speed to stop at the top of its stroke.

While I have shown and described a gear unit associated with a testing machine of the inclined plane type, the gear unit is also adapted to be used in testing machines wherein a force is applied directly to the specimen through the rack or a similar element.

I claim:

1. In a testing machine, a rack mounted for reciprocal movement for controlling the application of force to a specimen, a gear unit operable for reciprocating said rack comprising a shaft mounted for rotation in either direction and operatively connected to said rack for reciprocating the same, a first means including a right-hand gear fixed to said shaft for rotating said shaft in one direction, a second means including a left-hand gear fixed to said shaft for rotating said shaft in the other direction, a third means for rotating said shaft in the said other direction at an accelerated speed, said third means including a gear mounted for free movement on said shaft, a clutching device for connecting said gear to said shaft for rotating the same, and means for selecting either the said second or third means for rotating said shaft.

2. In a testing machine, a rack mounted for reciprocal movement for controlling the application of force to a specimen, a gear unit operable for reciprocating said rack comprising a shaft mounted for rotation in either direction and operatively connected to said rack for reciprocating the same, a first means including a right-hand gear fixed to said shaft for rotating said shaft in one direction, a second means including a left-hand gear fixed to said shaft for rotating said shaft in the other direction, a third means for rotating said shaft in the said other direction at an accelerated speed, and means for selecting either the said second or third means for rotating said shaft, the last said means being operable during progress of a test.

3. In a testing machine, a member mounted for reciprocal movement for controlling the application of force to a specimen, a train of gears for moving said member in one direction including a right-hand gear fixed to said shaft, a second train of gears including certain gears of the first said train of gears and a left-hand gear fixed to said shaft for moving said member in the other direction at a speed equal to the movement of said member in the first said direction, a third train of gears including certain gears in the said first and second train of gears for moving said member in the said other direction at an increased speed, and means for selecting either of said second or third train of gears for moving said member in the said other direction.

4. In a testing machine, a rack mounted for reciprocal movement, a gear unit for reciprocating said rack, means to operate said unit to reciprocate said rack at the same speed in either direction and also operate said rack at one speed in one direction and at an increased speed in the other direction, said gear unit comprising a shaft operatively connected to said rack, gear means including a right-hand gear fixed to said shaft for rotating the same in one direction, a second gear means including a left-hand gear fixed to the shaft for rotating said shaft in the other direction at the same speed, a third gear means for rotating said shaft in one direction at an increased speed and means operable for selecting either of said second or third gear means for rotating said shaft.

5. In a testing machine, a rack mounted for reciprocal movement, a gear unit for reciprocating said rack, means to operate said unit to reciprocate said rack at the same speed in either direction and also operate said rack at one speed in one direction and at an increased speed in the other direction, said gear unit comprising a shaft operatively connected to said rack, gear means including a right-hand gear fixed to said shaft for rotating said shaft in one direction, a second gear means including a left-hand gear fixed to said shaft for rotating said shaft in the other direction at the same speed, a third gear means carried by said shaft for rotating the same in the said other direction at an increased speed, and a clutching device for operatively connecting said third gear means to said shaft.

6. In a gear box for a testing machine a reciprocally mounted rack, a rotatably mounted shaft operatively connected to said rack through which motion is transmitted and rotatable in one direction for imparting a working stroke to said rack and rotatable in the other direction for imparting a return movement to said rack, a right- and left-hand worm gear on said shaft, a right-hand worm mounted to be movable in and out of engagement with said right-hand worm gear, a left-hand worm mounted to be movable in and out of engagement with said left-hand worm gear, means for moving said worms alternately in and out of engagement with said worm gears and means for rotating said worms.

7. In a gear box as set forth in claim 6 wherein said means comprises a rocker on which said worms are mounted.

8. In a gear box for a testing machine, a reciprocally mounted rack, a rotatable shaft operatively connected to said rack through which motion is transmitted to said rack for imparting a working stroke thereto in one direction and a return movement in the other direction, a right- and left-hand worm gear of equal size on said shaft for rotating the same in one or the other direction at the same speed, a gear rotatably mounted on said shaft, a clutching device for connecting said gear to said shaft for rotating the same, said gear being of a size to rotate said shaft at a greater speed than said worm gears, a right-hand worm mounted to be moved in and out of engagement with said right-hand worm gear, a left-hand worm mounted to be moved into and out of engagement with said left-hand worm gear, and means for blocking the operation of said clutch when either of said worms are moved into engagement with said worm gears.

9. In a gear box as set forth in claim 8 wherein means are provided for blocking the movement of said right- and left-hand worms into engagement with said right and left worm gears when said gear is connected to said shaft to rotate the same.

10. In a testing machine, a rack mounted for reciprocal movement for controlling the application of force to a specimen, a gear unit operable for reciprocating said rack comprising a shaft mounted for rotation in either direction and operatively connected to said rack for reciprocating the same, a first means including a right-hand gear fixed to said shaft for rotating said shaft in one direction, a second means including a left-hand gear fixed to said shaft for rotating said shaft in the other direction, a third means for rotating said shaft in the said other direction at an eccelerated speed, said third means including a gear mounted for free movement on said shaft, a clutching device for connecting said gear to said shaft for rotating the same, means for selecting either the said second or third means for rotating said shaft, and means for blocking the operation of said clutch when either of said first and second means are selected for rotating said shaft.

11. In a gear box for a testing machine, a reciprocally mounted rack, a rotatably mounted shaft operatively connected to said rack through which motion is transmitted, gear means for rotating said shaft, said gear means including a gear rotatably mounted on said shaft, a rocker shaft, a clutching device operatively connected to said shaft and operated thereby upon the rocking of said rocker shaft for connecting said gear to said rotatable shaft for rotating the same, resiliently yielding means for rocking said rocker shaft, and an arm movably mounted on said rocker shaft and movable into position to be engaged by said clutching device to block the movement thereof.

12. In a gear box as set forth in claim 11 wherein said arm is spring loaded to be moved in the opposite direction, and cam means for moving said arm in the clutch engaging position.

LOUIS BLUMENBAUM.

REFERENCES CITED

The following references are of record in the file of this patent:

UNITED STATES PATENTS

| Number | Name | Date |
|---|---|---|
| 1,552,516 | Sternkopf | Sept. 8, 1925 |
| 1,917,507 | Demkier et al. | July 11, 1933 |
| 2,055,523 | Dingeldein | Sept. 29, 1936 |